(12) United States Patent
Saito et al.

(10) Patent No.: US 8,967,543 B2
(45) Date of Patent: Mar. 3, 2015

(54) AIRCRAFT ICE PROTECTION SYSTEM AND AIRCRAFT PROVIDED WITH THE SAME

(75) Inventors: Isao Saito, Tokyo (JP); Tatsuo Ishiguro, Tokyo (JP); Shigeki Abe, Tokyo (JP); Hideaki Tanaka, Tokyo (JP); Toru Takasu, Tokyo (JP); Motohiro Atsumi, Tokyo (JP); Masakazu Nakanishi, Tokyo (JP); Minoru Kamogari, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 169 days.

(21) Appl. No.: 13/816,562

(22) PCT Filed: Aug. 30, 2011

(86) PCT No.: PCT/JP2011/069609
§ 371 (c)(1),
(2), (4) Date: Mar. 19, 2013

(87) PCT Pub. No.: WO2012/029782
PCT Pub. Date: Mar. 8, 2012

(65) Prior Publication Data
US 2013/0195658 A1    Aug. 1, 2013

(30) Foreign Application Priority Data

Aug. 30, 2010 (JP) .................................. 2010-192618

(51) Int. Cl.
*B64D 15/02* (2006.01)
*F01D 25/02* (2006.01)
*B64D 15/04* (2006.01)

(52) U.S. Cl.
CPC ................ *F01D 25/02* (2013.01); *B64D 15/04* (2013.01)

USPC ............... 244/134 B; 244/134 R; 244/134 C; 239/599; 60/39.09

(58) Field of Classification Search
USPC ....................................... 244/134 B
See application file for complete search history.

(56) References Cited

U.S. PATENT DOCUMENTS 2,581,760 A * 1/1952 Miner et al. ............... 244/134 R
3,441,236 A * 4/1969 Arnholdt ....................... 244/204
(Continued)

FOREIGN PATENT DOCUMENTS

EP    0 436 243    7/1991
JP    58-156499    9/1983
(Continued)

OTHER PUBLICATIONS

International Search Report issued Nov. 15, 2011 in International (PCT) Application No. PCT/JP2011/069609 with English translation.

(Continued)

*Primary Examiner* — Christopher P Ellis
*Assistant Examiner* — Medhat Badawi
(74) *Attorney, Agent, or Firm* — Wenderoth, Lind & Ponack, L.L.P.

(57) ABSTRACT

An aircraft ice protection system is provided for preventing ice accretion on a wing of an aircraft or removing the accreted ice. Bleed air extracted from a main engine of the aircraft and air introduced from an air intake installed on an airframe and heated by a heat source of the airframe of the aircraft are selectively supplied to a hot air chamber formed inside the wing, thereby carrying out ice protection.

11 Claims, 9 Drawing Sheets

(56) References Cited

U.S. PATENT DOCUMENTS

| | | | | |
|---|---|---|---|---|
| 3,449,891 | A * | 6/1969 | Amelio et al. | 55/306 |
| 3,576,329 | A * | 4/1971 | Weaver | 277/616 |
| 3,917,193 | A * | 11/1975 | Runnels, Jr. | 244/207 |
| 3,925,979 | A * | 12/1975 | Ziegler | 60/785 |
| 4,688,745 | A * | 8/1987 | Rosenthal | 244/134 R |
| 4,738,416 | A * | 4/1988 | Birbragher | 244/134 B |
| 5,011,098 | A * | 4/1991 | McLaren et al. | 244/134 B |
| 5,400,984 | A * | 3/1995 | Arnold et al. | 244/134 B |
| 5,807,454 | A * | 9/1998 | Kawabe et al. | 156/214 |
| 5,841,079 | A * | 11/1998 | Parente | 181/214 |
| RE36,215 | E * | 6/1999 | Rosenthal | 244/134 B |
| 5,921,502 | A * | 7/1999 | Al-Khalil et al. | 244/134 R |
| 6,003,814 | A * | 12/1999 | Pike et al. | 244/134 B |
| 6,079,670 | A * | 6/2000 | Porte | 244/134 B |
| 6,102,333 | A * | 8/2000 | Gerardi et al. | 244/134 R |
| 6,196,500 | B1 * | 3/2001 | Al-Khalil et al. | 244/134 R |
| 6,267,328 | B1 * | 7/2001 | Vest | 244/134 B |
| 6,354,538 | B1 * | 3/2002 | Chilukuri | 244/134 B |
| 6,371,411 | B1 * | 4/2002 | Breer et al. | 244/134 R |
| 6,457,676 | B1 * | 10/2002 | Breer et al. | 244/134 R |
| 6,585,191 | B2 * | 7/2003 | Andre et al. | 244/134 B |
| 6,688,558 | B2 * | 2/2004 | Breer et al. | 244/134 R |
| 6,702,233 | B1 * | 3/2004 | DuPont | 244/134 B |
| 6,848,656 | B2 * | 2/2005 | Linton | 244/134 C |
| 7,854,412 | B2 * | 12/2010 | Al-Khalil | 244/134 R |
| 7,900,872 | B2 * | 3/2011 | Sternberger | 244/134 C |
| 8,061,657 | B2 * | 11/2011 | Rocklin et al. | 244/134 B |
| 8,100,364 | B2 * | 1/2012 | Nieman et al. | 244/134 B |
| 8,342,443 | B2 * | 1/2013 | Gatzke | 244/53 R |
| 8,430,359 | B2 * | 4/2013 | Al-Khalil | 244/134 A |
| 8,434,724 | B2 * | 5/2013 | Chelin et al. | 244/207 |
| 8,579,236 | B2 * | 11/2013 | Wollaston | 244/214 |
| 8,602,359 | B2 * | 12/2013 | Stothers | 244/134 D |
| 8,757,547 | B2 * | 6/2014 | Porte et al. | 244/134 B |
| 8,777,164 | B2 * | 7/2014 | Vauchel et al. | 244/134 B |
| 2002/0027180 | A1 * | 3/2002 | Porte et al. | 244/134 B |
| 2002/0047070 | A1 * | 4/2002 | Breer et al. | 244/134 R |
| 2002/0139900 | A1 * | 10/2002 | Porte et al. | 244/134 C |
| 2002/0179773 | A1 * | 12/2002 | Breer et al. | 244/134 R |
| 2003/0150955 | A1 * | 8/2003 | Daggett | 244/57 |
| 2004/0031878 | A1 * | 2/2004 | Linton | 244/10 |
| 2007/0125908 | A1 * | 6/2007 | Eichholz et al. | 244/118.1 |
| 2007/0152444 | A1 * | 7/2007 | Kertesz et al. | 285/406 |
| 2008/0019822 | A1 * | 1/2008 | Grammel et al. | 415/115 |
| 2009/0108134 | A1 * | 4/2009 | Thodiyil et al. | 244/134 B |
| 2009/0152401 | A1 * | 6/2009 | Sternberger | 244/134 B |
| 2009/0194633 | A1 | 8/2009 | De Souza et al. | |
| 2010/0163677 | A1 * | 7/2010 | Rocklin et al. | 244/134 B |
| 2010/0314082 | A1 * | 12/2010 | Porte et al. | 165/157 |
| 2011/0011981 | A1 * | 1/2011 | Vauchel et al. | 244/134 B |
| 2011/0031353 | A1 * | 2/2011 | Stolte et al. | 244/207 |
| 2011/0139927 | A1 * | 6/2011 | Porte et al. | 244/1 N |
| 2012/0248249 | A1 * | 10/2012 | Hormiere et al. | 244/134 B |
| 2012/0298802 | A1 * | 11/2012 | Todorovic | 244/134 B |
| 2012/0318922 | A1 * | 12/2012 | Saito et al. | 244/134 B |
| 2013/0195658 | A1 * | 8/2013 | Saito et al. | 416/39 |

FOREIGN PATENT DOCUMENTS

| | | |
|---|---|---|
| JP | 1-149894 | 10/1989 |
| JP | 06-206593 | 7/1994 |
| JP | 09-071298 | 3/1997 |
| JP | 09-071299 | 3/1997 |
| JP | 11-034993 | 2/1999 |
| JP | 2003-291895 | 10/2003 |
| JP | 3529911 | 5/2004 |
| JP | 2008-521693 | 6/2008 |
| JP | 2008-309059 | 12/2008 |
| JP | 2009-523637 | 6/2009 |
| JP | 2010-100285 | 5/2010 |
| JP | 2011-516344 | 5/2011 |
| RU | 2 381 962 | 2/2010 |
| WO | 2009/127652 | 10/2009 |

OTHER PUBLICATIONS

Written Opinion of the International Searching Authority issued Nov. 15, 2011 in International (PCT) Application No. PCT/JP2011/069609 with English translation.

Japanese Notice of Allowance issued Jun. 17, 2014 in corresponding Japanese Patent Application No. 2010-192618 with English translation.

Russian Notice of Allowance issued May 23, 2014 in corresponding Russian Patent Application No. 2013106192 with English translation.

Chinese Office Action issued Sep. 1, 2014 in corresponding Chinese Patent Application No. 201180039942.5 with English Translation.

* cited by examiner

—·—·— SUCTION PUMPING SYSTEM
———— HIGH-PRESSURE (SUPPLY) SYSTEM
············ LOW-PRESSURE (RETURN) SYSTEM (a)

(b)

AIRCRAFT ICE PROTECTION SYSTEM AND AIRCRAFT PROVIDED WITH THE SAME

TECHNICAL FIELD

The present invention relates to an aircraft ice protection system for preventing ice accretion on the outside of a wing leading edge of an aircraft or removing the accreted ice during flight, and also relates to an aircraft provided with the ice protection system.

This application claims the right of priority to Japanese Patent Application No. 2010-192618 filed in Japan on Aug. 30, 2010, the content of which is hereby incorporated herein.

BACKGROUND ART

An aircraft is provided with ice protection equipment for preventing ice accretion on a wing leading edge of the aircraft or removing the accreted ice during flight. Then, the ice protection equipment is provided with a hot air chamber formed inside the wing leading edge of a main wing, and bleed air (high-temperature air) extracted from a main engine is supplied to the hot air chamber to heat the wing leading edge of the main wing from inside (refer to Patent Document 1 and Patent Document 2, for example).

PRIOR ART DOCUMENTS

Patent Documents

[Patent Document 1] Japanese Published Unexamined Utility Model Application No. H1-149894
[Patent Document 2] Japanese Published Unexamined Patent Application No. H6-206593

SUMMARY OF THE INVENTION

Problems to be Solved by the Invention

In general, the above-described conventional ice protection equipment is operated only under conditions where ice accretion easily takes place on an airframe, for example, in clouds or the like. However, since a wing leading edge is heated with bleed air extracted from a main engine of an aircraft, problems are posed such as a decrease in the original impelling force of a main engine and poor operation cost associated with a decrease in fuel consumption efficiency. That is, these problems partially contribute to reduced performance of an aircraft.

In view of the above-described situation, the present invention provides an aircraft ice protection system which is capable of effectively carrying out ice protection and also capable of improving the performance of an aircraft such as suppression of a decrease in impelling force of a main engine and an improvement in fuel consumption efficiency, and also provides an aircraft provided with the ice protection system.

Means for Solving the Problems

In order to attain the above-described object, the invention provides the following means.

The aircraft ice protection system of the present invention is an ice protection system for preventing ice accretion on a wing of an aircraft or removing the accreted ice. The ice protection system is provided with a hot air chamber which is formed inside the wing of the aircraft, a bleed air supply line which supplies bleed air extracted from a main engine of the aircraft to the hot air chamber, a heated air supply line which supplies air introduced from an air intake of the aircraft to the hot air chamber via a heat source of the aircraft, and switching device which selectively supplies the bleed air and the air heated by the heat source to the hot air chamber. The wing is heated by the air supplied to the hot air chamber, and ice protection of the wing is carried out.

In this invention, as with a conventional invention, the bleed air is supplied from the main engine to the hot air chamber, thereby protecting the wing (wing leading edge) from ice, the air introduced from the air intake installed on the airframe is also fed into a heat source of the airframe of the aircraft by ram pressure, and hot air (heated air) is produced by utilizing the heat source. Then, ice protection is carried out by supplying the heated air to the hot air chamber.

Further, in the aircraft ice protection system of the present invention, it is preferred that the heat source be at least one of an oil cooler, an oil tank, and a main engine of the aircraft, the oil cooler and the oil tank being mounted on a hydraulic circuit provided on the aircraft.

In this invention, as a heat source for heating the air introduced from the air intake, the oil cooler or the oil tank on the hydraulic circuit or the main engine of the aircraft is adopted, thereby reliably heating the air at such a temperature that can be utilized for ice protection.

In particular, conventionally, air introduced from the air intake is used as a cooling medium and heated air after heat exchange is discharged outside. However, in this invention, the heated air is effectively used for ice protection.

Further, when heat exchange is performed with hydraulic oil pooled in the oil tank to heat the air, the present invention performs not only cooling the hydraulic oil, which is at a high temperature, by an oil cooler but also causing temperature decrease (making low in temperature) of the hydraulic oil inside the oil tank by exchanging heat with the air. Thereby, the hydraulic oil can be delayed in oxidation and deterioration, and replacement interval of the hydraulic oil is prolonged.

Still further, in the aircraft ice protection system of the present invention, it is preferred that the oil cooler be provided with a double-pipe structured heat transfer pipe which is composed of an inner pipe through which hydraulic oil flows and an outer pipe through which the air introduced from the air intake flows between the outer pipe and the inner pipe, and the air be heated by exchanging heat with the hydraulic oil flowing through the inner pipe.

In this invention, the oil cooler is configured in such a manner that the air introduced from the air intake is allowed to flow between the outer pipe and the inner pipe of the double-pipe structured heat transfer pipe. Thereby, heat exchange is performed with the hydraulic oil flowing through the inner pipe to reliably and efficiently heat the air, and the heated air is effectively used for ice protection.

Further, in the aircraft ice protection system of the present invention, it is further preferred that projected portions be provided on an outer face of the inner pipe.

In this invention, the projected portions are provided on the outer face of the inner pipe to increase a heat transfer area. Further, when the air flows between the outer pipe and the inner pipe, the flow of the air turns into a turbulent state at the projected portions, thereby facilitating heat exchange between the hydraulic oil and the air. As a result, the heat exchange is performed at a higher efficiency, and the piping length inside the oil cooler (the heat transfer pipe length) is decreased. Further, the piping inside the oil cooler can be decreased in length as described above, which contributes to a reduction in weight of the airframe of the aircraft.

Still further, in the aircraft ice protection system of the present invention, it is preferred that the oil tank be provided with an outer shell which forms a flowing space between the outer shell and an outer face of a tank main body which pools hydraulic oil, and the air flowing through the flowing space be heated by exchanging heat with the hydraulic oil inside the tank main body.

In this invention, the oil tank is formed so as to have the outer shell which forms the flowing space between the outer shell and the outer face of the tank main body, thereby allowing the air to flow through the flowing space and reliably heating the air by using the oil tank as a heat source.

Further, in the aircraft ice protection system of the present invention, it is preferred that projected portions be provided on an outer face of the tank main body.

In this invention, since the projected portions are provided on the outer face of the tank main body, a heat transfer area is increased. Further, when the air flows through the flowing space between the tank main body and the outer shell, the flow the air turns into a turbulent state at the projected portions, thereby facilitating heat exchange with the hydraulic oil. Thus, the heat exchange is performed at a higher efficiency to reliably and efficiently heat the air, and the heated air is also effectively used for ice protection.

Still further, in the aircraft ice protection system of the present invention, it is preferred that the main engine be provided with an outer shell which forms a flowing space between the outer shell and an outer face of a casing, and the air be heated by allowing the air flowing through the flowing space.

In this invention, the main engine is configured so as to have an outer shell which forms a flowing space between the outer shell and, for example, an outer face of a casing of a burner, which is at a relatively high temperature. Air is allowed to flow through the flowing space, by which the air is heated, with the main engine used as a heat source.

Further, in the aircraft ice protection system of the present invention, it is preferred that projected portions be provided on the outer face of the casing.

In this invention, since the projected portions such as the fins are provided on the outer face of the casing, a heat transfer area is increased. Further, when the air flows through the flowing space between the casing and the outer shell, the flow of the air turns into a turbulent state at the projected portions, thereby facilitating heat exchange with the main engine. As a result, the heat exchange is performed at a higher efficiency to reliably and efficiently heat the air, and the heated air is also effectively used for ice protection.

Further, in the aircraft ice protection system of the present invention, it is preferred that the projected portions on the outer face of the casing be formed in such a manner that the air flows while swirling along the outer face of the casing.

In this invention, the air is allowed to flow while swirling along the outer face of the casing by the projected portions on the outer face of the casing. Thereby, contact time of the air on the casing is increased to raise the efficiency of heat exchange, thus making it possible to reliably and efficiently heat the air and also effectively use the heated air for ice protection.

In the aircraft ice protection system of the present invention, the switching device may include a first on-off valve installed on the bleed air supply line, a second on-off valve installed on the heated air supply line, and a controller for controlling operation of the first and the second on-off valves.

The aircraft of the present invention is provided with any one of the above-described aircraft ice protection systems. In this invention, working effects of the above-described aircraft ice protection systems are obtained.

Effects of the Invention

According to the aircraft ice protection system of the present invention and the aircraft provided with the ice protection system, in addition to a same configuration as the conventional which supplies bleed air from the main engine to the hot air chamber, air introduced from the air intake installed on the airframe of the aircraft is fed into a heat source of the airframe of the aircraft by ram pressure, by which hot air (heated air) produced by utilizing the heat source is supplied to the hot air chamber to carry out ice protection.

Thereby, the bleed air and the air heated by the heat source are selectively supplied to the hot air chamber to carry out ice protection. Therefore, when the air heated by the heat source is able to sufficiently carry out ice protection, it is no longer necessary to use the bleed air. Further, when only the air heated by the heat source is insufficient in carrying out ice protection, the bleed air is used to reliably carry out ice protection. Still further, even when the bleed air is used, the heated air is able to keep a wing heat in advance (able to heat the wing in advance), realizing a state in which ice accretion is less likely to take place, thus making it possible to suppress an extract amount of the bleed air to a minimum level.

As described above, the bleed air extracted from the main engine becomes unnecessary or an extract amount of the bleed air is suppressed to a minimum level during flight. Therefore, as compared with an aircraft having conventional ice protection equipment, it is possible to improve the performance of the aircraft such as suppression of a decrease in impelling force of the main engine and a reduction in operation cost associated with improvement in fuel consumption efficiency.

MODE FOR CARRYING OUT THE INVENTION

First Embodiment

Hereinafter, a description will be given of an aircraft ice protection system of a First Embodiment in the present invention and an aircraft provided with the ice protection system with reference to FIG. 1 to FIG. 5.

Figure 1:
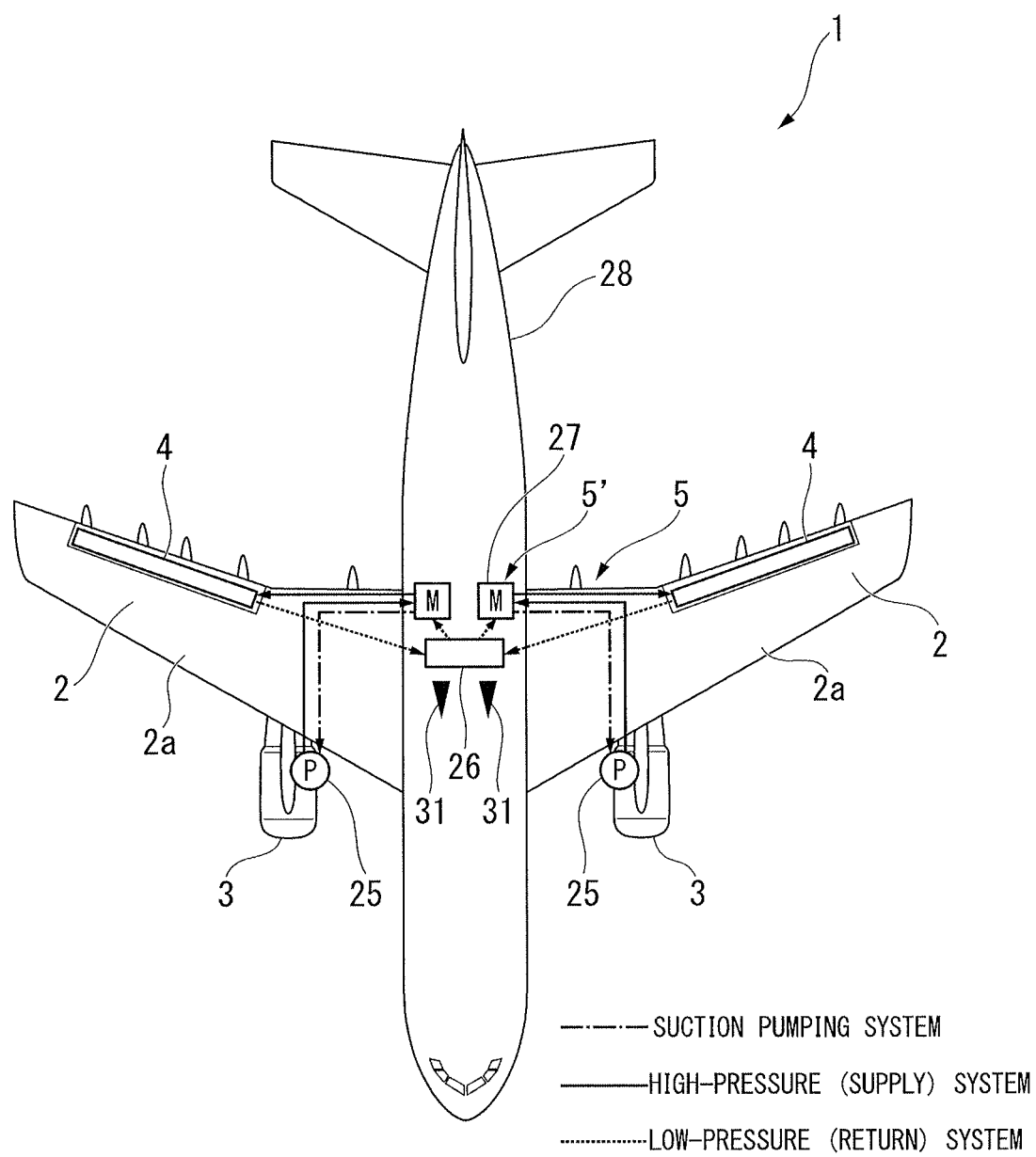
FIG. 1 is a drawing which shows an aircraft according to an embodiment of the present invention.
Figure 2:
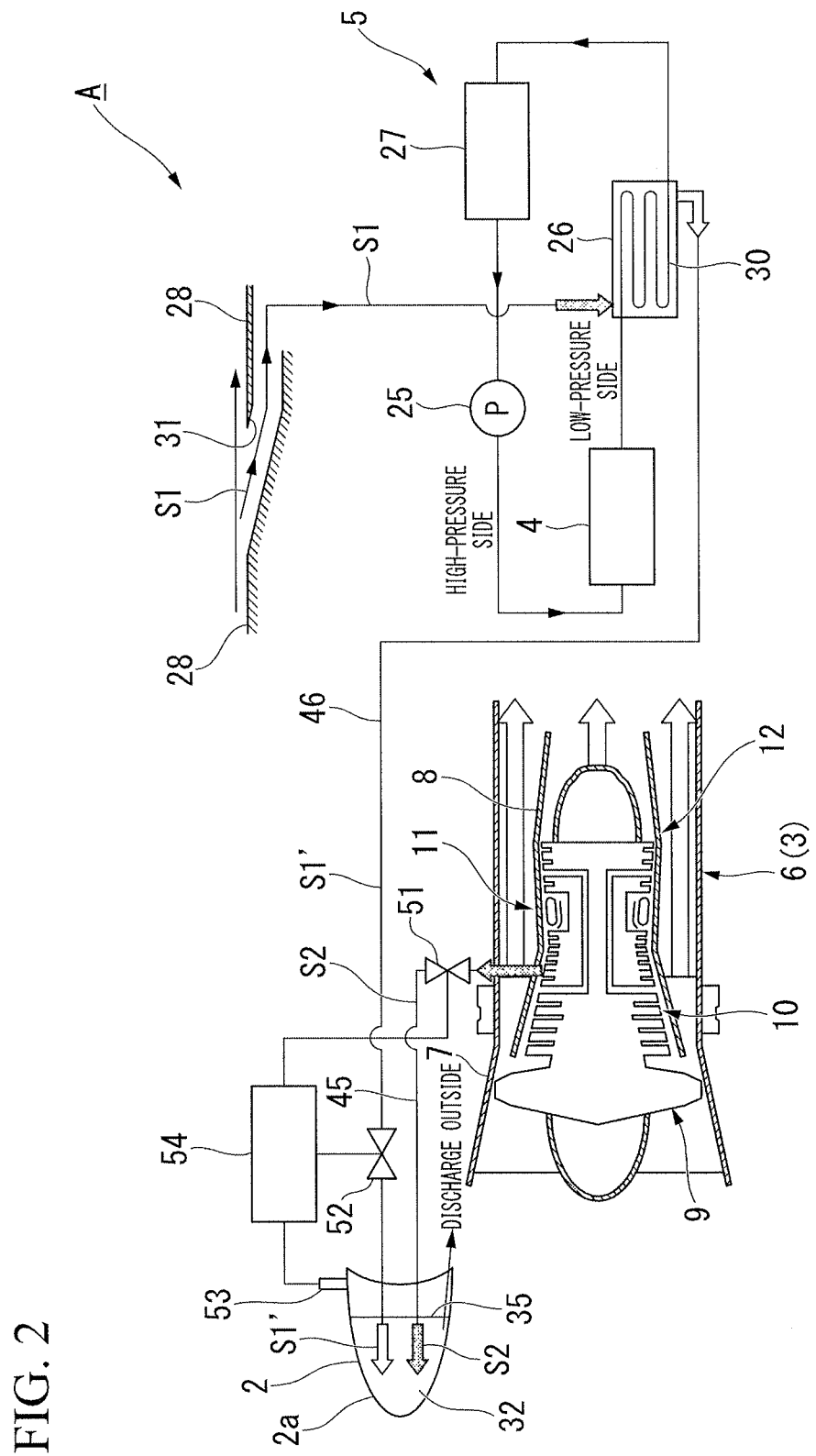
FIG. 2 is a drawing which shows an aircraft ice protection system of a First Embodiment in the present invention.

First, as shown in FIG. 1 and FIG. 2, an aircraft 1 of the present embodiment is provided with a main engine 3 installed on a main wing 2, a hydraulic pump 25 which uses the main engine 3 as a driving source, a hydraulic circuit 5 actuated by the hydraulic pump 25, and a manifold 5' for controlling an actuator 4 which configures a part of the hydraulic circuit 5 and is installed on the main wing 2.

Figure 3:
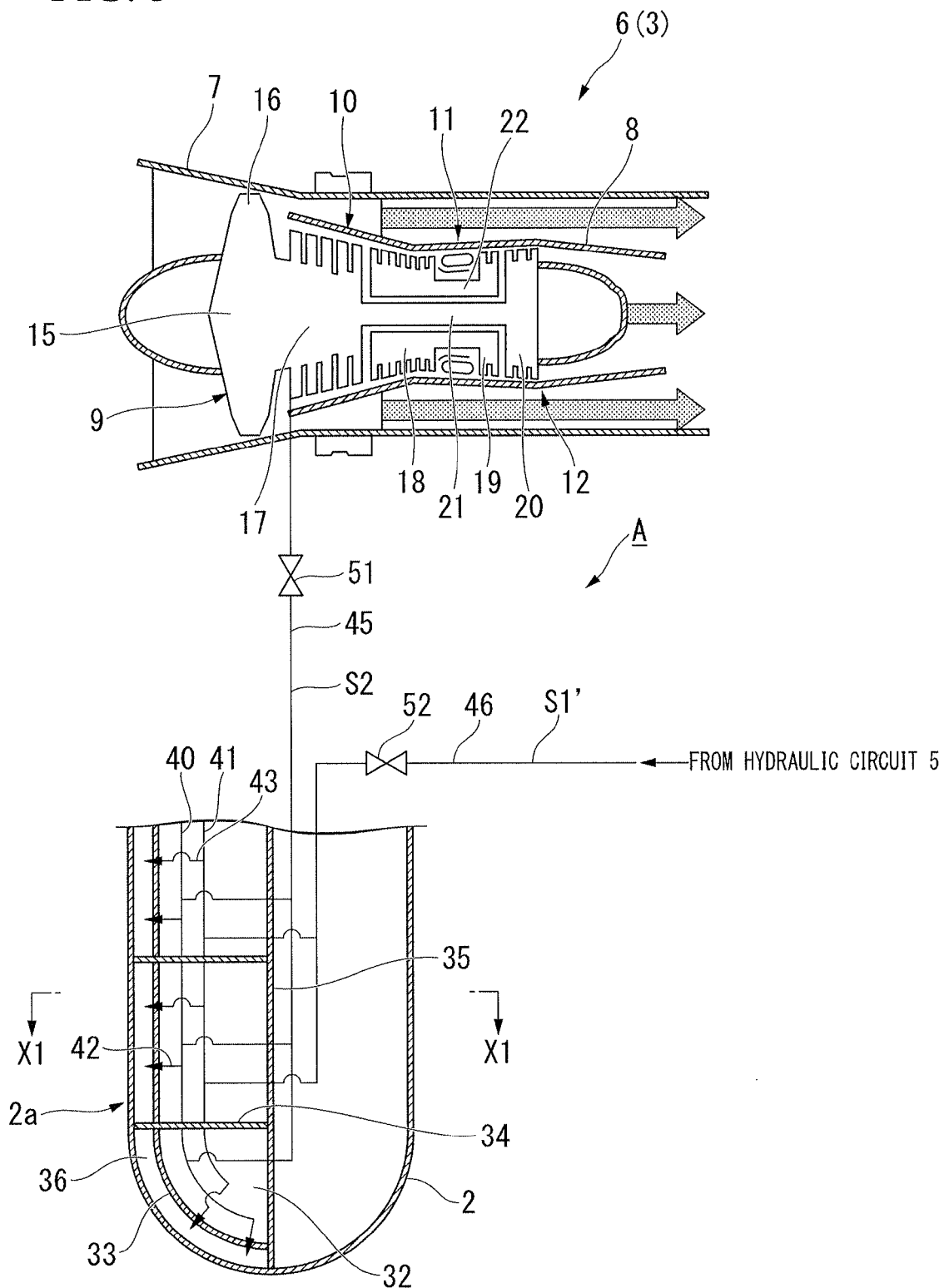
FIG. 3 is a drawing which shows a main engine and also a configuration for supplying bleed air from the main engine to a hot air chamber of a wing.

As shown in FIG. 3, a gas turbine 6, which is the main engine 3, is provided with a fan casing 7 and a core engine casing 8. The gas turbine 6 houses a fan 9 inside the fan casing 7, and also the gas turbine 6 houses a compressor 10, a burner 11 and a turbine 12 inside the core engine casing 8.

The fan 9 is formed by attaching a plurality of fan blades 16 on an outer circumference of a rotating shaft 15. The compressor 10 is provided with a low-pressure compressor 17 and a high-pressure compressor 18. The turbine 12 is provided with a high-pressure turbine 19 and a low-pressure turbine 20 and disposed on the downstream side of the compressor 10. Then, the rotating shaft 15 of the fan 9 is connected to the low-pressure compressor 17, and the low-pressure compressor 17 is connected to the low-pressure turbine 20 by a first rotor shaft 21. Further, the high-pressure compressor 18 is connected to the high-pressure turbine 19 by a cylindrical second rotor shaft 22 positioned on an outer circumference side of the first rotor shaft 21.

Then, air introduced from the air intake port is compressed by passing through a plurality of compressor vanes and compressor blades (not illustrated) installed on the low-pressure compressor 17 and the high-pressure compressor 18 of the compressor 10, thereby turned into compressed air which is high temperature and high pressure. Further, a predetermined fuel is supplied to the compressed air in the burner 11 and the fuel is burnt to produce a combustion gas which is high temperature and high pressure. The produced combustion gas passes through the plurality of turbine vanes and turbine blades (not illustrated) installed on the high-pressure turbine 19 and the low-pressure turbine 20 which configure the turbine 12, thereby rotating and driving the turbine 12. At this time, power of the low-pressure turbine 20 is transmitted to the fan 9 by the first rotor shaft 21, and the fan 9 sends air, thereby producing an impelling force.

As shown in FIG. 1 and FIG. 2, the hydraulic circuit 5 of the present embodiment supplies and discharges hydraulic oil to the actuator 4 for a flight control system such as a flap, an aileron, a rudder and landing equipment to drive the actuator 4. The hydraulic circuit 5 is provided with a hydraulic pump 25, an oil cooler (heat exchanger) 26 and an oil tank 27. Further, for example, as shown in FIG. 1, the hydraulic pump 25 is driven by the main engine and is installed inside a main engine nacelle. In addition, the oil cooler 26 and the oil tank 27 are installed at a lower part of a body (airframe) 28.

Then, in the hydraulic circuit 5, as shown in FIG. 1 and FIG. 2, hydraulic oil is supplied from the oil tank 27 to the actuator 4 by driving the hydraulic pump 25 and the actuator 4 is actuated. At the same time, the hydraulic oil (return oil) from the actuator 4 is fed back to the oil tank 27 through the oil cooler 26. At this time, the oil cooler 26 is formed in such a manner that the heat-transfer pipe (hydraulic line) 30 meanders. Thus, low-temperature air S1 introduced from the air intake 31 installed on the body 28 is used as a cooling medium to carry out heat exchange between the air S1 and return oil, which is at a high-temperature of 70° C. to 80° C., for example, thereby cooling the return oil. Then, the return oil is fed back to the oil tank 27.

On the other hand, in the aircraft ice protection system A of the present embodiment, as shown in FIG. 2 and FIG. 3, bleed air (high-temperature air) S2 extracted from the main engine 3 and air S1' introduced from the air intake 31 and heated by the oil cooler 26 (a heat source of an airframe of an aircraft) are selectively supplied to the hot air chamber 32 formed inside a wing leading edge 2a of the main wing 2 to carry out ice protection.

Figure 4:
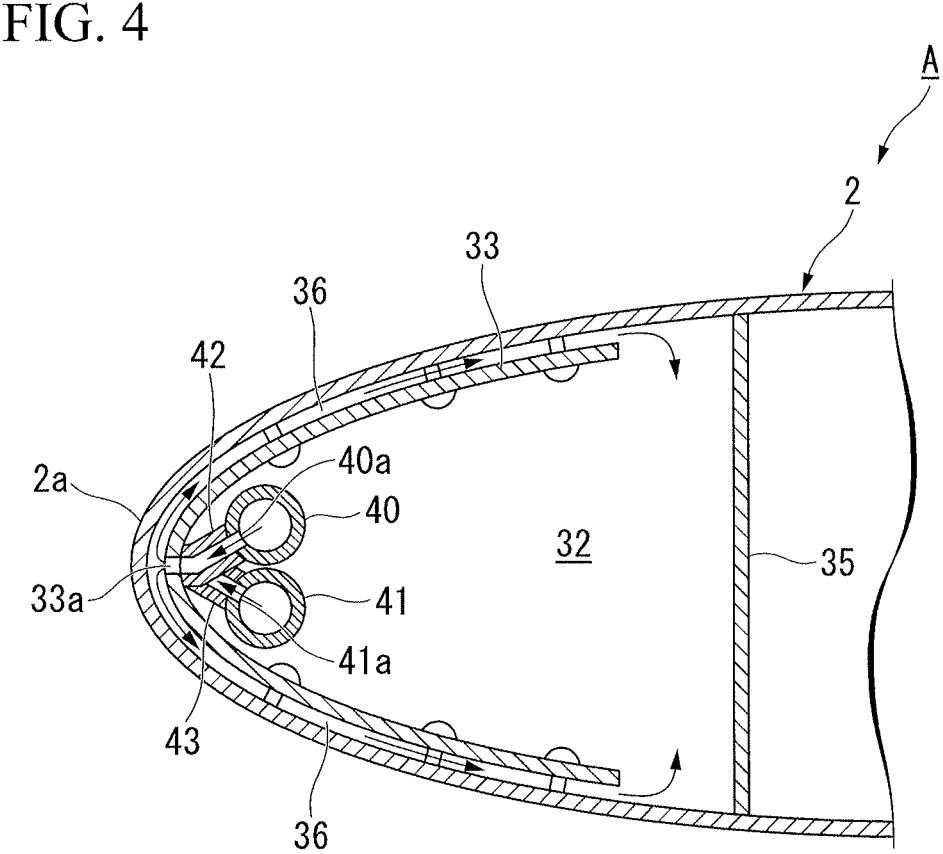
FIG. 4 is a cross-sectional view of the hot air chamber of the wing taken along X1-X1 in FIG. 3.

Here, in the present embodiment, as shown in FIG. 3 and FIG. 4, in the wing leading edge 2a of the main wing 2, a tip thereof is formed in a curved shape by jointing, for example, upper and lower curved plates, and a guide plate 33 is disposed inside the wing leading edge 2a, with a predetermined clearance kept. As with the wing leading edge 2a, the tip of the guide plate 33 is also formed in a curved shape by jointing, for example, upper and lower curved plates. In addition, the wing leading edge 2a is a part which includes the vicinity of the leading edge of the wing 2.

Further, the wing leading edge 2a extends along the longitudinal direction of the main wing 2 (in the perpendicular direction on the plane of the page of FIG. 4). The guide plate 33 has a predetermined length along the width direction of the aircraft 1 and the plurality of guide plates 33 are installed together in this direction. Still further, a partition wall 34 is provided inside the wing leading edge 2a along the longitudinal direction of the main wing 2 and also along the front-back direction of the main wing 2 (in the lateral direction in FIG. 3). The partition wall 34 is formed in the longitudinal direction of the main wing 2, with a predetermined clearance kept. In addition, each of the guide plates 33 is installed by keeping both ends thereof in contact with or fixed on end faces of the partition wall 34.

The hot air chamber 32 is formed by being surrounded with the wing leading edge 2a, the partition wall 35 at the rear thereof, and partition walls 34 on both sides. Further, a space between the wing leading edge 2a and the guide plate 33 is given as a hot air path 36, and the hot air path 36 runs along the inside of the wing leading edge 2a and extends from the tip of the wing leading edge 2a to the rear thereof and is opened to the hot air chamber 32. The hot air chamber 32 is provided with a discharge port which discharges air inside the hot air chamber 32 to the outside, whenever necessary.

Further, as shown in FIG. 4, inside the hot air chamber 32, two duct pipes 40, 41 are disposed at the tip side of the wing leading edge 2a so as to be adjacent to the guide plate 33. Each of the duct pipes 40, 41 is formed with both ends closed and extends so as to penetrate through the partition wall 34 along the longitudinal direction of the main wing 2. Still further, the guide plate 33 is provided with an opening 33a at a position corresponding to the tip of the wing leading edge 2a. Respectively on the duct pipes 40, 41, injection holes 40a, 41a are formed which are opened to the front of the wing leading edge 2a at a position facing to the opening 33a formed on the guide plate 33. Then, the duct pipes 40, 41 are configured so that the injection holes 40a, 41a are connected respectively via connecting pipes 42, 43 to the opening 33a of the guide plate 33. At this time, the openings 33a, the injection holes 40a, 41a, and the connecting pipes 42, 43 are provided in a plural number on a single guide plate 33, with a predetermined clearance kept. In addition, these two duct pipes 40, 41 are installed by connecting the injection holes 40a, 41a to the opening 33a of the guide plate 33 respectively via the connecting pipes 42, 43. That is, they are installed individually by being communicatively connected to the hot air path 36.

Then, as shown in FIG. 2 to FIG. 4, in the aircraft ice protection system A of the present embodiment, one duct pipe 40 is connected to the compressor 10 of the main engine 3 by piping (bleed air supply line) 45, and bleed air S2 of the compressor 10 of the main engine 3 is supplied from the bleed air supply line 45 to the hot air path 36 (hot air chamber 32).

Figure 5:
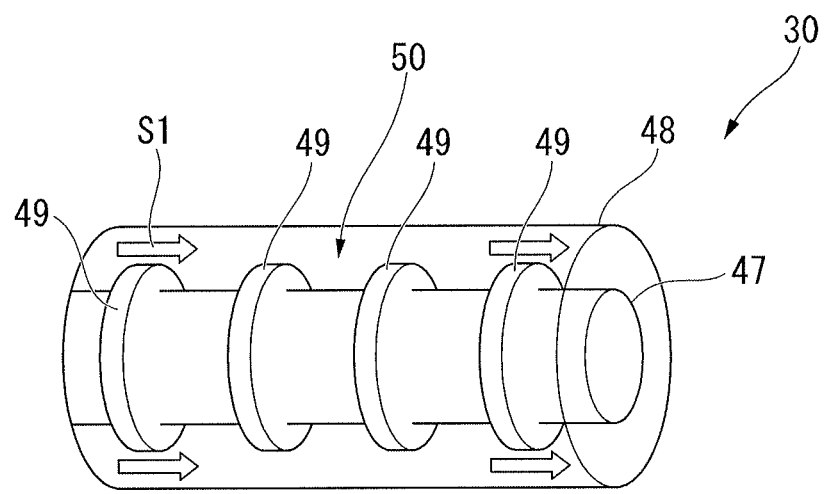
FIG. 5 is a drawing which shows a heat transfer pipe mounted on an oil cooler of the aircraft ice protection system of the First Embodiment in the present invention.

Further, the other duct pipe 41 is connected to the oil cooler 26 mounted on the hydraulic circuit 5 by piping (heated air supply line) 46. At this time, in the present embodiment, as shown in FIG. 2 and FIG. 5, the meandering heat transfer pipe 30 of the oil cooler 26 is formed in a double pipe structure by an inner pipe 47 in which hydraulic oil discharged from the actuator 4 flows and an outer pipe 48 in which air S1 introduced from the air intake 31 is allowed to flow between the outer pipe 48 and the inner pipe 47. Further, a plurality of rings are attached to the inner pipe 47 in an integrated manner, and these rings form projected portions 49 projecting toward an inner face of the outer pipe 48 from an outer face of the inner pipe 47.

Further, the other duct pipe 41 is connected to a flowing space 50 in which the air S1 between the inner pipe 47 and the outer pipe 48 of the heat transfer pipe 30 of the oil cooler 26 flows via the heated air supply line 46.

Still further, as shown in FIG. 2, the bleed air supply line 45 and the heated air supply line 46 are provided respectively with on-off valves 51, 52. Then, in the aircraft ice protection system A of the present embodiment, these on-off valves 51, 52 are controlled for opening and closing by a valve controller 54 based on results measured by a thermometer 53 for measuring a surface temperature (outer-face temperature or outside-air temperature) of the wing leading edge 2a of the main wing 2.

In addition, each of the bleed air supply line 45 and the heated air supply line 46 is provided with a check valve or the like (not illustrated) for preventing air from flowing back to the main engine 3 or the oil cooler (heat source) 26 from the hot air chamber 32 (hot air path 36).

Next, a description will be given of operation and effects of the above-configured aircraft ice protection system A of the present embodiment.

First, in the ice protection system A of the present embodiment, air S1 is introduced from the air intake 31 during flight and fed to the oil cooler 26 by ram pressure, and heat exchange is performed in which the air S1 is used as a cooling medium to cool hydraulic oil by the oil cooler 26. At this time, the heat transfer pipe 30 of the oil cooler 26 is formed in a double pipe structure, by which the air S1 flows through the flowing space 50 between the inner pipe 47 and the outer pipe 48. Then, as described above, the low-temperature air S1 passes through the flowing space 50 and flows along the inner pipe 47 through which the hydraulic oil kept at a high temperature flows. Thereby, heat exchange is efficiently performed between the hydraulic oil and the air S1 to heat the air S1.

Further, in the present embodiment, the projected portions 49 are provided on the outer face of the inner pipe 47 by fixing the plurality of rings on the inner pipe 47. Therefore, the inner pipe 47 is increased in heat transfer area, and the flow of the air S1 which flows through the flowing space 50 between the inner pipe 47 and the outer pipe 48 is turned into a turbulent state, thereby facilitating heat exchange. Thereby, the heat exchange is performed at a higher efficiency, and the air S1 is heated reliably and efficiently.

As described above, the air (hot air) S1' heated by the oil cooler 26 is supplied through the heated air supply line 46 to the other duct pipe 41 of the hot air chamber 32, and injected into the hot air path 36 between the wing leading edge 2a and the guide plate 33 from the injection hole 41a of the other duct pipe 41 through the connecting pipe 43 and the opening 33a of the guide plate 33. Then, the heated air S1' flows inside the hot air path 36, by which the wing leading edge 2a is heated from the inside, thus making it possible to prevent ice accretion on the outside of the wing 2 or to remove the accreted ice.

As described above, in the ice protection system A of the present embodiment, the air S1 which was conventionally discharged outside after being introduced from the air intake 31 and used as a cooling medium of the oil cooler 26 is utilized for ice protection. Thereby, when the air S1' heated by the oil cooler 26 can be used to carry out ice protection sufficiently, it is no longer necessary to use the bleed air S2. That is, when the thermometer 53 detects a temperature at which sufficient ice protection can be attained, the on-off valve 51 is closed and the on-off valve 52 is opened by control of the valve controller 54. Therefore, only the air S1' is supplied to the hot air path 36 through the injection hole 41a of the other duct pipe 41, the connecting pipe 43 and the opening 33a of the guide plate 33.

On the other hand, when only the air S1' heated by the oil cooler 26 is not able to provide sufficient effects of ice protection, that is, when the thermometer 53 detects a temperature at which sufficient ice protection is not attained, the valve controller 54 controls the opening and closing of the on-off valves 51, 52 in response to the detection results. Thereby, the bleed air S2 is injected to the hot air path 36 from the main engine 3 through the injection hole 40a of the one duct pipe 40, the connecting pipe 42 and the opening 33a of the guide plate 33. Then, since the bleed air S2 is higher in temperature than the air S1' heated by the oil cooler 26, it is possible to reliably carry out ice protection.

Therefore, in the aircraft ice protection system A of the present embodiment, as with a conventional case, the bleed air S2 is supplied to the hot air chamber 32 from the main engine 3, thus making it possible to protect the wing leading edge 2a from ice. Also, the air S1 introduced from the air intake 31 installed on the airframe 28 is fed to the oil cooler 26 by ram pressure, thereby producing the hot air (heated air) S1'.

Further, as described in the present embodiment where the oil cooler 26 in which the air S1 introduced from the air intake 31 was conventionally used as a cooling medium and the air S1' after heat exchange was discharged outside is used as a heat source, heat produced in association with flight of the aircraft 1 is effectively used for ice protection.

Therefore, when the bleed air S2 and the air S1' heated by the oil cooler 26 can be selectively supplied to the hot air chamber 32 to carry out ice protection. In addition, when the air S1' heated by the oil cooler 26 can be used to attain sufficient ice protection, it is no longer necessary to use the bleed air S2. Further, when only the air S1' heated by the oil cooler 26 is unable to attain sufficient ice protection, the bleed air S2 is used to reliably carry out ice protection. Still further, even when the bleed air S2 is used, the heated air S1' can be used to keep the wing 2 heat in advance (able to heat the wing 2 in advance), thereby realizing a state that ice accretion is less likely to take place. It is, thus, possible to suppress an extract amount of the bleed air S2 to a minimum level.

According to the aircraft ice protection system A of the present embodiment and the aircraft 1 provided with the ice protection system A, the bleed air S2 extracted from the main engine 3 becomes unnecessary or an extract amount of the bleed air S2 is suppressed to a minimum necessary level during flight. Therefore, as compared with an aircraft provided with conventional ice protection equipment, it is possible to suppress a decrease in impelling force of the main engine and improve the performance of the aircraft such as a reduction in operation cost associated with an improvement in fuel consumption efficiency.

Further, in the aircraft ice protection system A of the present embodiment, the oil cooler 26 is configured in such a manner that the air S1 introduced from the air intake 31 is allowed to flow between the outer pipe 48 and the inner pipe 47 of the double-pipe structured heat transfer pipe 30. Thereby, heat exchange can be performed with hydraulic oil which flows through the inner pipe 47, thereby reliably heating the air S1.

Still further, since the projected portions 49 are provided on the outer face of the inner pipe 47, the inner pipe 47 is increased in heat transfer area. And, when the air S1 flows between the outer pipe 48 and the inner pipe 47, the projected portions 49 turn the flow into a turbulent state, thereby facilitating heat exchange. Accordingly, it is possible to increase the efficiency of heat exchange between the hydraulic oil flowing through the inner pipe 47 and the air S1 flowing between the inner pipe 47 and the outer pipe 48. Thus, the piping length inside the oil cooler 26 (heat transfer pipe length) can be decreased. Then, as described above, since the piping inside the oil cooler 26 is decreased in length, it is possible to reduce the weight of the airframe of the aircraft 1.

Second Embodiment

Next, with reference to FIG. 1, and FIG. 3 to FIG. 7, a description will be given of an aircraft ice protection system of a Second Embodiment in the present invention and an aircraft provided with the ice protection system. The aircraft ice protection system of the present embodiment is mainly different from the First Embodiment only in a heat source that heats air introduced from an air intake. Therefore, configurations similar to those of the First Embodiment will be given the same reference numerals, with a detailed description omitted here.

Figure 6:
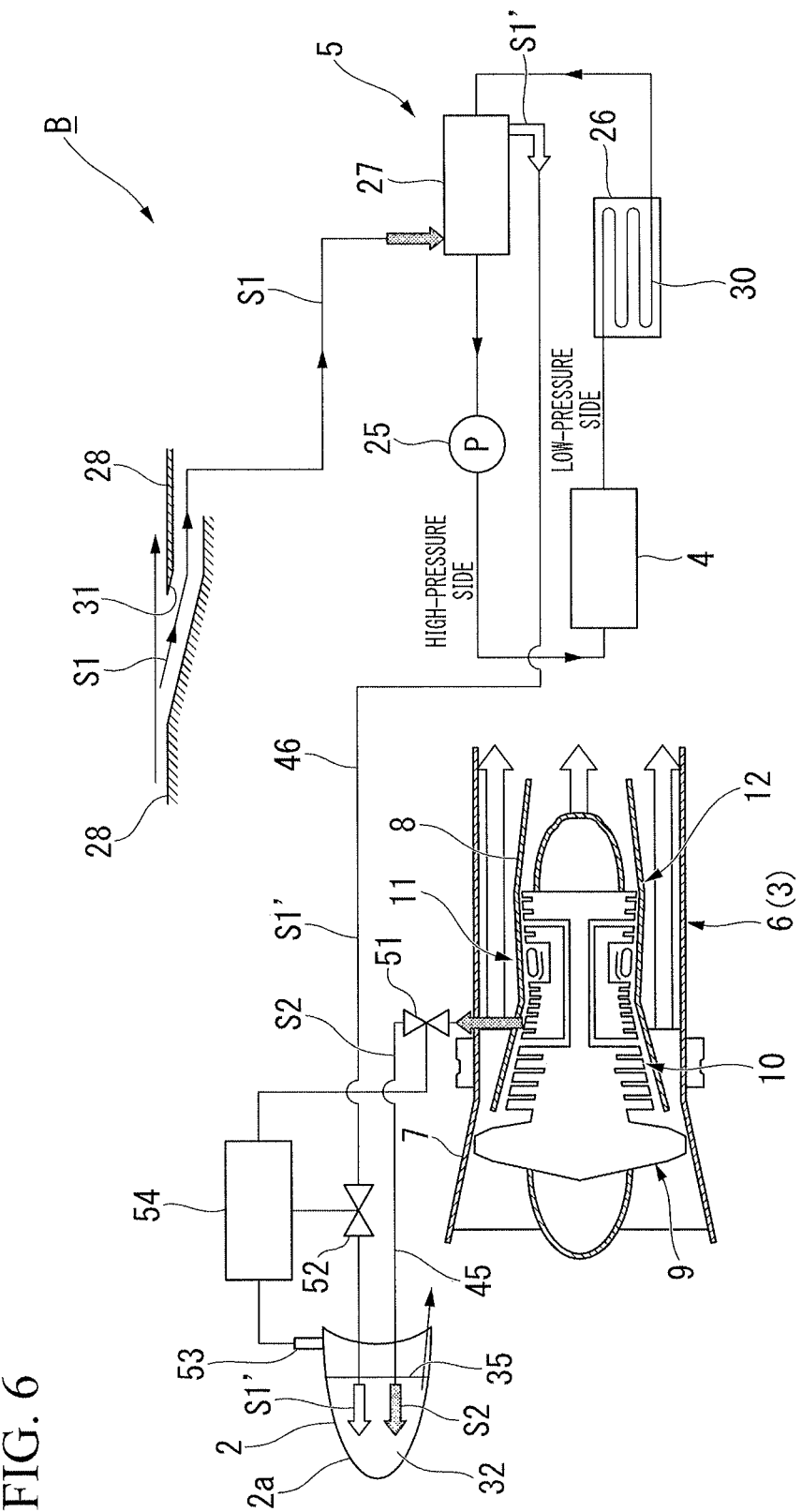
FIG. 6 is a drawing which shows an aircraft ice protection system of a Second Embodiment in the present invention.

As shown in FIG. 6, the aircraft ice protection system B of the present embodiment selectively supplies bleed air S2 extracted from a main engine 3 and air S1' introduced from an air intake 31 and heated at an oil tank (a heat source of an airframe of an aircraft) 27 to a hot air chamber 32 formed inside a wing leading edge 2a of a main wing 2, thereby carrying out ice protection.

Figure 7:
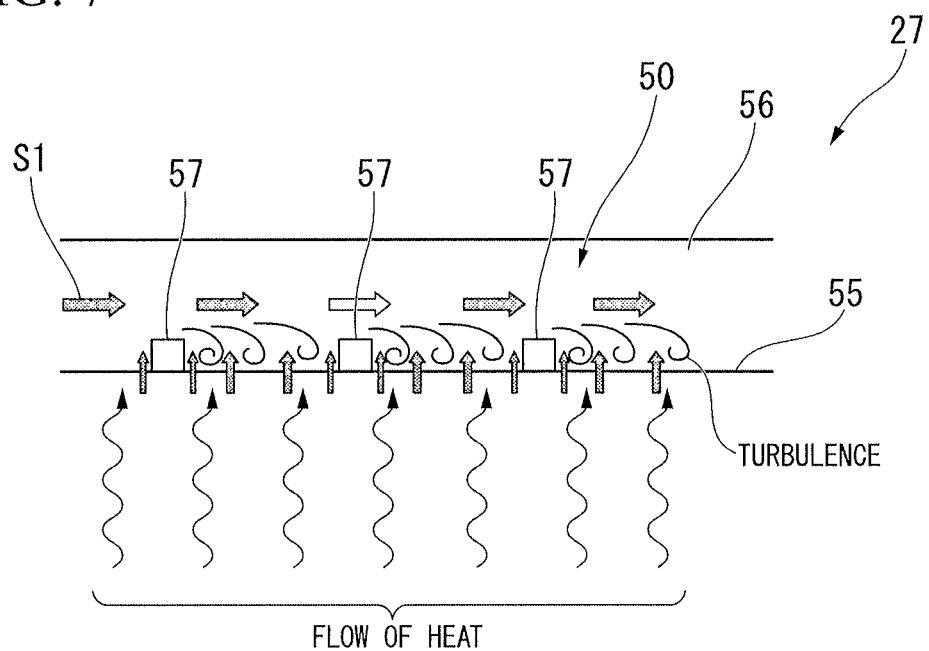
FIG. 7 is a drawing which shows a part of an oil tank (tank main body, outer shell and flowing space) of the aircraft ice protection system of the Second Embodiment in the present invention.

Further, as shown in FIG. 7, the oil tank 27 is provided with an outer shell 56 which forms a flowing space 50 between the outer shell 56 and an outer face of a tank main body 55 which pools hydraulic oil. Still further, the tank main body 55 is provided with projected portions (projected pieces) 57 on the outer face.

As shown in FIG. 4 and FIG. 6, the other duct pipe 41 is connected to the oil tank 27 mounted on a hydraulic circuit 5 by a heated air supply line 46. At this time, the other duct pipe 41 is connected to the flowing space 50 at which air S1 between the tank main body 55 of the oil tank 27 and the outer shell 56 flows via the heated air supply line 46.

In addition, one duct pipe 40 is connected to the main engine 3 by a bleed air supply line 45, as with the First Embodiment. The bleed air S2 of the main engine 3 is supplied from the one duct pipe 40 to a hot air path 36 (hot air chamber 32).

In the above-configured aircraft ice protection system B of the present embodiment, the air S1 is introduced from the air intake 31 and fed into the oil tank 27 by ram pressure during flight. And, heat exchange is performed between the air S1 and hydraulic oil which is temporarily pooled at the tank main body 55 of the oil tank 27. At this time, the oil tank 27 is formed so as to have the tank main body 55 and the outer shell 56, and the air S1 flows through the flowing space 50 between the tank main body 55 and the outer shell 56. Then, the air S1 passes through the flowing space 50 and flows along the outer face of the tank main body 55 at which the hydraulic oil is pooled. Thus, heat is efficiently exchanged between the hydraulic oil and the air S1 to heat the air S1.

Further, in the present embodiment, since the projected portions 57 are provided on the outer face of the tank main body 55, the tank main body 55 is increased in heat transfer area. The flow of the air S1 which flows through the flowing space 50 between the tank main body 55 and the outer shell 56 is turned into a turbulent state, thereby facilitating heat exchange. As a result, as with the First Embodiment, the heat exchange is performed at a higher efficiency to heat air reliably and efficiently.

As described above, the air (hot air) S1' heated at the oil tank 27 is supplied through the heated air supply line 46 to the other duct pipe 41 of the hot air chamber 32, and injected into the hot air path 36 between the wing leading edge 2a and the guide plate 33 from an injection hole 41a of the other duct pipe 41 through a connecting pipe 43 and an opening 33a of the guide plate 33. Then, the heated air S1' flows inside the hot air path 36, by which the wing leading edge 2a is heated from inside to prevent ice accretion on the outside of the wing 2 or remove the accreted ice.

Thereby, in the ice protection system B of the present embodiment as well, when the air S1' heated at the oil tank 27 is able to carry out ice protection sufficiently, it is no longer necessary to use the bleed air S2. On the other hand, when only the air S1' heated at the oil tank 27 is not able to attain sufficient effects of ice protection, a valve controller 54 controls opening and closing of on-off valves 51, 52, as with the First Embodiment. Thereby, the bleed air S2 is injected into the hot air path 36 from the main engine 3 through an injection hole 40a of the one duct pipe 40, the connecting pipe 42 and the opening 33a of the guide plate 33. Since the bleed air S2 is higher in temperature than the air S1' heated at the oil tank 27, it is possible to reliably carry out ice protection.

Therefore, in the aircraft ice protection system B of the present embodiment, as with the First Embodiment, the bleed air S2 is supplied from the main engine 3 to the hot air chamber 32, thus making it possible to protect the wing leading edge 2a from ice. Further, the air S1 introduced from the air intake 31 installed at the airframe 28 is fed into the oil tank 27 by ram pressure, thereby producing the hot air (heated air) S1' by utilizing the oil tank 27.

Thereby, the bleed air S2 and the air S1' heated at the oil tank 27 are selectively supplied to the hot air chamber 32, thus making it possible to carry out ice protection. When the air S1' heated at the oil tank 27 can be used to carry out ice protection sufficiently, it is no longer necessary to use the bleed air S2. Further, when only the air S1' heated at the oil tank 27 is unable to attain sufficient ice protection, the bleed air S2 is used to reliably carry out ice protection. Still further, even when the bleed air S2 is used, the heated air S1' can be used to keep the wing 2 heat in advance, thereby realizing a state at which ice accretion is less likely to take place. Thus, it is possible to suppress an extract amount of the bleed air S2 to a minimum level.

Therefore, in the aircraft ice protection system B of the present embodiment (and the aircraft 1 provided with the ice protection system B) as well, the bleed air S2 extracted from the main engine 3 becomes unnecessary or an extract amount of the bleed air S2 is suppressed to a necessary minimum level during flight. Consequently, as compared with an aircraft having conventional ice protection equipment, a decrease in impelling force of the main engine is suppressed to improve the performance of the aircraft such as a reduction in operation cost associated with an improvement in fuel consumption efficiency.

Further, as described in the present embodiment, when heat is exchanged with hydraulic oil which is pooled in the oil tank 27 to heat the air S1, the present invention performs not only cooling the hydraulic oil, which is at a high temperature, by an oil cooler 26 but also causing temperature decrease (making low in temperature) of the hydraulic oil inside the oil tank 27 by exchanging heat with the air S1. Thereby, the hydraulic oil can be delayed in oxidation and deterioration, and replacement interval of the hydraulic oil is prolonged.

Third Embodiment

Next, with reference to FIG. 1, FIG. 3 to FIG. 5, FIG. 8 and FIG. 9, a description will be given of an aircraft ice protection system of a Third Embodiment in the present invention and an aircraft provided with the ice protection system. In the aircraft ice protection system of the present embodiment, air introduced from an air intake is heated by an oil cooler and a main engine. That is, a heat source is different from the First Embodiment and Second Embodiment. Therefore, in the present embodiment as well, configurations similar to those of the First Embodiment and Second Embodiment will be given the same reference numerals, with a detailed description omitted here.

Figure 8:
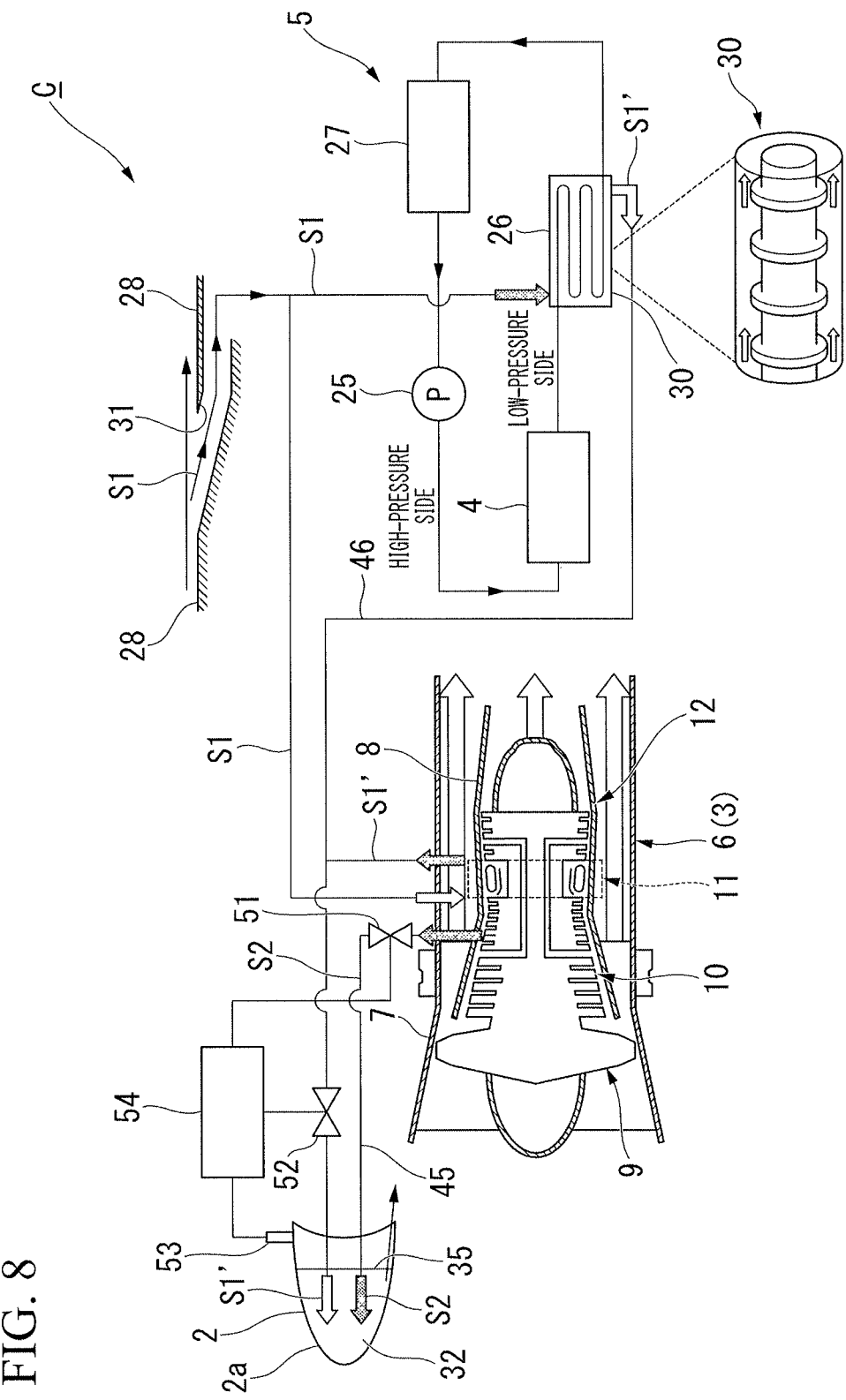
FIG. 8 is a drawing which shows an aircraft ice protection system of a Third Embodiment in the present invention.

As shown in FIG. 8, the aircraft ice protection system C of the present embodiment selectively supplies bleed air S2 extracted from a main engine 3 and air S1' introduced from an air intake 31 and heated by the main engine 3 and an oil cooler 26 (a heat source of an airframe of an aircraft) to a hot air chamber 32 formed inside a wing leading edge 2a of a main wing 2, thereby carrying out ice protection.

Further, in the present embodiment, air S1 introduced from the air intake 31 is branched and fed individually to the oil cooler 26 and the main engine 3 by ram pressure. The air S1' heated respectively by the oil cooler 26 and the main engine 3 is mixed and supplied to the other duct pipe 41 inside the hot air chamber 32.

Then, the oil cooler 26 of the present embodiment is provided with a double-pipe structured heat transfer pipe 30, as with the First Embodiment (refer to FIG. 5).

Figure 9:
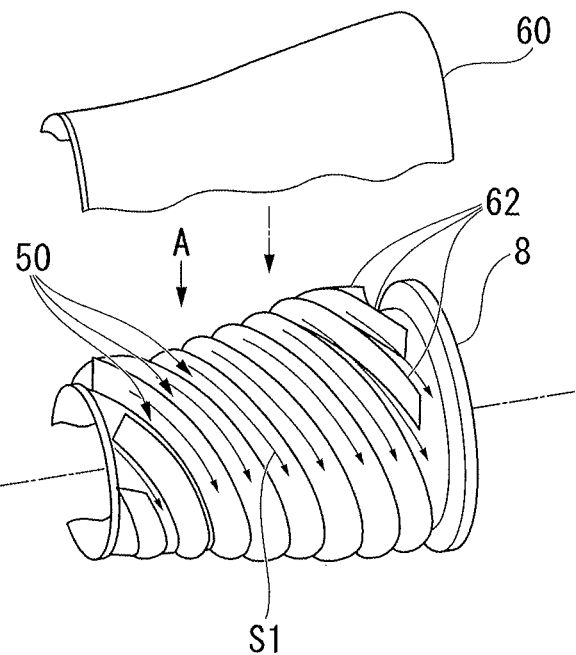
FIG. 9(a) is a drawing which shows a flowing space (casing, outer shell and projected portions) formed on a main engine of an aircraft ice protection system of the Third Embodiment in the present invention.
FIG. 9(b) is a sectional view taken along an arrow A in FIG. 9(a).
Figure 9:
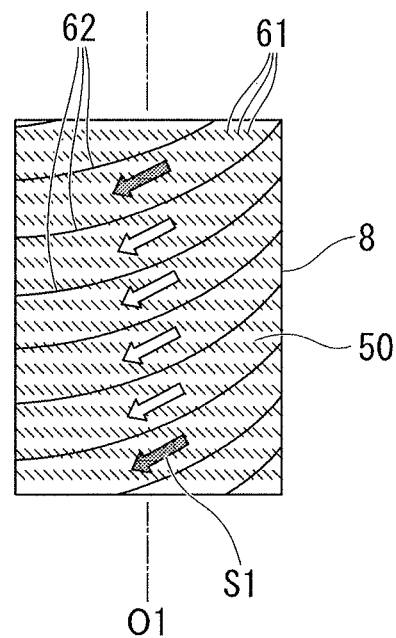

On the other hand, in the main engine 3, for example, a casing of a burner 11 is formed in a double-tubular structure. That is, as shown in FIG. 9, a tubular core engine casing 8 is provided with an outer shell 60 which forms a flowing space 50 between the outer shell 60 and an outer face of the core engine casing 8. Further, a part having the outer shell 60 (the burner 11 in the present embodiment) is provided with first projected portions (projected portions) 61 such as fins which are arranged in a dispersed manner all over the outer face of the core engine casing 8. Each of the first projected portions 61 is formed so as to project from the outer face of the core engine casing 8 to an inner face of the outer shell 60. That is, the tip of the projected portion 61 is not in contact with the inner face of the outer shell 60.

Further, in the present embodiment, in addition to the first projected portions 61, a plurality of second projected portions (projected portions) 62 projecting from the outer face to the inner face of the outer shell 60 are installed on an outer face of the core engine casing 8 at the part having the outer shell 60. Then, these second projected portions 62 are formed so as to extend in a circumferential direction at the center of an axis line O1 of the core engine casing 8 and also gradually move from one end side to the other end side in the direction of the axis line O1. A predetermined clearance is also given between adjacent second projected portions 62. Thereby, a helical flowing space 50 is formed between the second projected portions 62 which are adjacent with each other in the direction of the axis line O1.

Then, in the present embodiment, the other duct pipe 41 is connected to the oil cooler 26 and the main engine 3 by a heated air supply line 46. At this time, the other duct pipe 41 is connected to a flowing space 50 between an inner pipe 47 and an outer pipe 48 of the oil cooler 26 and also to a flowing space 50 between the core engine casing 8 and the outer shell 60 of the main engine 3 via the heated air supply line 46.

One duct pipe 40 is connected to the main engine 3 by the bleed air supply line 45, as with the First and Second Embodiments. Bleed air S2 of the main engine 3 is supplied from the one duct pipe 40 to the hot air path 36.

In the above-configured aircraft ice protection system C of the present embodiment, the air S1 is introduced from the air intake 31 during flight, branched and fed into the oil cooler 26 and the main engine 3 by ram pressure. The air S1 is heated by exchanging heat with the oil cooler and heated also by exchanging heat with the core engine casing 8 of the main engine 3. At this time, in the main engine 3, the air S1 flows through the plurality of flowing spaces 50 between the core engine casing 8 and the outer shell 60. Then, since these flowing spaces 50 (the plurality of second projected portions 62) are formed in a helical manner, the air S1 flowing through each of the flowing spaces 50 flows while swirling along the outer face of the tubular core engine casing 8. Therefore, the air S1 is efficiently heated by the outer face of the core engine casing 8 and the second projected portions 62.

Further, in the present embodiment, since the first projected portions 61 are provided on the outer face of the core engine casing 8 of the main engine 3, a heat transfer area is increased by the second projected portions 62 and the first projected portions 61. Further, the flow of the air S1 flowing through each of the flowing spaces 50 is turned into a turbulent state, thereby facilitating heat exchange. Thereby, the heat exchange is performed at a higher efficiency and the air is heated reliably and efficiently.

As described above, the air (hot air) S1' heated outside the core engine casing 8 of the main engine 3 is mixed with the air S1' heated by the oil cooler 26 and supplied to the other duct pipe 41 of the hot air chamber 32 through the heated air supply line 46. Then, the air S1' is injected into the hot air path 36 between the wing leading edge 2a and the guide plate 33 from an injection hole 41a of the other duct pipe 41 through the connecting pipe 43 and an opening 33a of the guide plate 33. The heated air S1' flows inside the hot air path 36, by which the wing leading edge 2a is heated from inside, thus preventing ice accretion on the outside of the wing 2 or removing the accreted ice.

Thereby, in the ice protection system C of the present embodiment as well, when the air S1' heated by the main engine 3 (and the air S1' heated by the oil cooler 26) can be used to carry out ice protection sufficiently, it is no longer necessary to use the bleed air S2. On the other hand, when only the air S1' heated by the main engine 3 (and the air S1' heated by the oil cooler 26) is unable to attain sufficient effects of ice protection, as with the First Embodiment and Second Embodiment, the valve controller 54 controls opening and closing of the on-off valves 51, 52. And, the bleed air S2 is injected into the hot air path 36 between the wing leading edge 2a and the guide plate 33 from the main engine 3 through the injection hole 40a of one duct pipe 40, the connecting pipe 42 and the opening 33a of the guide plate 33. Since this bleed air S2 is higher in temperature than the heated air S1', it is possible to reliably carry out ice protection.

In the present embodiment, the air S1 is heated by flowing outside the core engine casing 8 of the main engine 3. Therefore, as compared with a case where a heat source is made available only from the oil cooler 26 or the oil tank 27 on the hydraulic circuit 5 as found in the First Embodiment and Second Embodiment, the main engine 3 is designed so as not to cause a reduction in impelling force and the main engine 3 is used as a heat source. Thereby, the air S1' supplied to the hot air chamber 32 is made higher in temperature. As a result, effects of ice protection can be made greater than in the First Embodiment and Second Embodiment.

Therefore, in the aircraft ice protection system C of the present embodiment, as with the First Embodiment and Second Embodiment, the bleed air S2 is supplied from the main engine 3 to the hot air chamber 32, thus it makes possible to protect the wing leading edge 2a from ice. In addition, the air S1 introduced from the air intake 31 installed on the airframe 28 is fed into the main engine 3 (and the oil cooler 26) by ram pressure, and the main engine 3 is utilized to produce the hot air (heated air) S1'.

Thereby, the bleed air S2 and the air S1' heated by the main engine 3 are selectively supplied to the hot air chamber 32 to carry out ice protection. And, when the air S1' heated by the main engine 3 is able to carry out ice protection sufficiently, it is no longer necessary to use the bleed air S2. Further, when only the air S1' heated by the main engine 3 is unable to carry out ice protection sufficiently, the bleed air S2 can be used to reliably carry out ice protection. Still further, even when the bleed air S2 is used, the heated air S1' can be used to keep the wing 2 heat in advance and realize a state in which ice accretion is less likely to take place. It is, therefore, possible to suppress an extract amount of the bleed air S2 to a minimum level.

Therefore, in the aircraft ice protection system C of the present embodiment (and the aircraft 1 provided with the ice protection system C) as well, the bleed air S2 extracted from main engine 3 is made unnecessary or an extract amount of the bleed air S2 is suppressed to a minimum necessary level during flight. Therefore, as compared with an aircraft having conventional ice protection equipment, a decrease in impelling force of the main engine is suppressed to improve the performance of the aircraft such as a reduction in operation cost associated with an improvement in fuel consumption efficiency.

Further, as described in the present embodiment, the first projected portions 61 such as fins are provided on the outer face of the core engine casing 8 to increase a heat transfer area. Still further, when the air S1 flows through the flowing space 50 between the core engine casing 8 and the outer shell 60, the first projected portions 61 turn the flow into a turbulent state, thereby facilitating heat exchange. As a result, the heat exchange is performed at a higher efficiency with the air S1 flowing through the flowing space 50, thereby heating the air S1 reliably and efficiently. Also, the heated air S1' is effectively used for ice protection.

Still further, the second projected portions 62 are formed in such a manner that the air S1 is allowed to flow while swirling along the outer face of the core engine casing 8. Therefore, contact time of the air S1 on the core engine casing 8 is increased to raise the efficiency of heat exchange. And, the air S1 is heated reliably and efficiently and the heated air S1' is effectively used for ice protection.

A description has been so far given of First, Second and Third Embodiments of the aircraft ice protection systems in the present invention. The present invention shall not be limited to the above-described First, Second and Third Embodiments but may be modified whenever necessary within a scope not departing from the gist of the present invention.

For example, as with the Third Embodiment when a heat source is provided by a combination of the main engine 3 and the oil cooler 26, heat sources of First, Second and Third Embodiments are selectively combined. That is, it is acceptable that the air S1 introduced from the air intake 31 be heated by using the oil cooler 26 and the oil tank 27; the oil tank 27 and the main engine 3; or the oil cooler 26, the oil tank 27 and the main engine 3; and supplied to the hot air chamber 32. In this case, it is also acceptable that the air S1' heated by a plurality of heat sources be individually supplied to the hot air chamber 32 (parallel system), or the air S1 be heated sequentially by a plurality of heat sources and supplied to the hot air chamber 32 (serial system).

Further, in the First, Second and Third Embodiments, a description has been given of a case where the bleed air S2 and the air S1' heated by a heat source are supplied to the hot air chamber 32 formed at the wing leading edge 2a of the main wing 2, thereby protecting the main wing 2 from ice. As a matter of course, it is acceptable that the hot air chamber 32 be formed at a tail assembly or the like, and ice protection systems A, B, C similar to those of the present embodiments be used to supply the bleed air S2 and the air S1' heated by a heat source to the hot air chamber 32 formed on the other wing (also to a hot air chamber 32 formed on the other wing), thereby attaining effects of ice protection.

Still further, in the Third Embodiment, the flowing space 50 for the air S1 is formed so as to have the first projected portions 61 and the helical second projected portions 62. Even in a case where projected portions relating to the present invention are provided as components, at least one of the first projected portions 61 and the second projected portions 62 are provided, thus making it possible to reliably and efficiently heat the air S1. In addition, the projected portions 49, 57, 61, 62 may not be necessarily formed in the flowing space 50.

When the main engine 3 is used to heat the air S1, it is not always necessarily restricted that the burner 11 be used to heat the air S1.

DESCRIPTION OF REFERENCE SYMBOLS

1: aircraft
2: main wing (wing)
2a: wing leading edge
3: main engine (heat source)
4: actuator
5: hydraulic circuit
5': manifold
6: gas turbine
7: fan casing
8: core engine casing
9: fan
10: compressor
11: burner
12: turbine
15: rotating shaft
16: fan blade
17: low-pressure compressor
18: high-pressure compressor
19: high-pressure turbine
20: low-pressure turbine
21: first rotor shaft
22: second rotor shaft
25: hydraulic pump
26: oil cooler (heat source)

27: oil tank (heat source)
28: body (airframe)
30: heat transfer pipe
31: air intake
32: hot air chamber
33: guide plate
33a: opening
34: partition wall
35: partition wall
36: hot air path
40: duct pipe
40a: injection hole
41: duct pipe
41a: injection hole
42: connecting pipe
43: connecting pipe
45: bleed air supply line
46: heated air supply line
47: inner pipe
48: outer pipe
49: projected portion
50: flowing space
51: on-off valve
52: on-off valve
53: thermometer
54: valve controller
55: tank main body
56: outer shell
60: outer shell
61: first projected portion (projected portion)
62: second projected portion (projected portion)
A: aircraft ice protection system
B: aircraft ice protection system
C: aircraft ice protection system
S1: air
S1': heated air
S2: bleed air

The invention claimed is:

1. An aircraft ice protection system for preventing ice accretion on a wing of an aircraft or removing the accreted ice,
the ice protection system comprising:
a hot air chamber which is formed inside the wing of the aircraft;
a bleed air supply line which supplies bleed air extracted from a main engine of the aircraft to the hot air chamber;
a heated air supply line which supplies air introduced from an air intake of the aircraft to the hot air chamber via a heat source of the aircraft; and
switching device which selectively supplies the bleed air and the air heated by the heat source to the hot air chamber,
wherein the wing is heated by the air supplied to the hot air chamber, and ice protection of the wing is carried out.

2. The aircraft ice protection system according to claim 1, wherein
the heat source is at least one of an oil cooler, an oil tank, and a main engine of the aircraft, the oil cooler and the oil tank being mounted on a hydraulic circuit provided on the aircraft.

3. The aircraft ice protection system according to claim 2, wherein
the oil cooler is provided with a double-pipe structured heat transfer pipe which is composed of an inner pipe through which hydraulic oil flows and an outer pipe through which the air introduced from the air intake flows between the outer pipe and the inner pipe, and
the air is heated by exchanging heat with the hydraulic oil flowing through the inner pipe.

4. The aircraft ice protection system according to claim 3, wherein
projected portions are provided on an outer face of the inner pipe.

5. The aircraft ice protection system according to claim 2, wherein
the oil tank is provided with an outer shell which forms a flowing space between the outer shell and an outer face of a tank main body which pools hydraulic oil, and
the air flowing through the flowing space is heated by exchanging heat with the hydraulic oil inside the tank main body.

6. The aircraft ice protection system according to claim 5, wherein
projected portions are provided on an outer face of the tank main body.

7. The aircraft ice protection system according to claim 2, wherein
the main engine is provided with an outer shell which forms a flowing space between the outer shell and an outer face of a casing, and
the air is heated by allowing the air flowing through the flowing space.

8. The aircraft ice protection system according to claim 7, wherein
projected portions are provided on the outer face of the casing.

9. The aircraft ice protection system according to claim 8, wherein
the projected portions on the outer face of the casing are formed in such a manner that the air flows while swirling along the outer face of the casing.

10. The aircraft ice protection system according to claim 1, wherein
the switching device includes:
a first on-off valve installed on the bleed air supply line;
a second on-off valve installed on the heated air supply line; and
a controller for controlling operation of the first and the second on-off valves.

11. An aircraft which is provided with the aircraft ice protection system according to claim 1.

* * * * *